(12) United States Patent
Sun et al.

(10) Patent No.: US 6,376,421 B2
(45) Date of Patent: Apr. 23, 2002

(54) ION EXCHANGED ALUMINUM-MAGNESIUM SILICATE OR FLUORINATED MAGNESIUM SILICATE AEROGELS AND CATALYST SUPPORTS THEREFROM

(75) Inventors: Tao Sun; David R. Wilson; Juan M. Garces, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/794,526

(22) Filed: Feb. 27, 2001

Related U.S. Application Data

(63) Continuation of application No. 09/260,340, filed on Mar. 2, 1999, now abandoned.
(60) Provisional application No. 60/079,442, filed on Mar. 26, 1998.

(51) Int. Cl.[7] ............................. B01J 31/00; B01J 21/04; B01J 21/12; B01J 21/14; B01J 21/10
(52) U.S. Cl. .................. 502/238; 502/233; 502/234; 502/235; 502/240; 502/237; 502/251; 502/263; 502/102; 502/103; 502/117
(58) Field of Search .................. 502/223, 234, 502/235, 237, 238, 240, 257, 263, 102, 103, 117

(56) References Cited

U.S. PATENT DOCUMENTS

| 2,688,002 A | 8/1954 | Milliken |
| 3,404,497 A | 10/1968 | Wilson et al. |
| 4,176,090 A | 11/1979 | Vaughan et al. |
| 4,216,188 A | 8/1980 | Shabtai et al. |
| 4,238,364 A | 12/1980 | Shabtai |
| 4,248,739 A | 2/1981 | Vaughan et al. |
| 4,271,043 A | 6/1981 | Vaughan et al. |
| 4,367,163 A | 1/1983 | Pinnavaia et al. |
| 4,499,194 A | 2/1985 | Harada et al. |
| 4,507,396 A * | 3/1985 | Hickson ..................... 502/8 |
| 4,666,887 A | 5/1987 | De Barbieri |
| 4,704,374 A * | 11/1987 | Jacques ..................... 502/8 |
| 4,761,391 A | 8/1988 | Occelli |
| 5,189,000 A * | 2/1993 | Masi et al. ................ 502/113 |
| 5,308,811 A | 5/1994 | Suga et al. |
| 5,362,825 A | 11/1994 | Hawley et al. |
| 5,529,965 A | 6/1996 | Chang |
| 5,858,320 A * | 1/1999 | You ..................... 423/327.1 |

FOREIGN PATENT DOCUMENTS

| EP | 658576 | 12/1994 |
| EP | 0669346 | 8/1995 |
| JP | 63/230581 | 3/1987 |
| JP | 01/103908 | 10/1987 |
| WO | WO 97/17136 | 5/1997 |

OTHER PUBLICATIONS

S. Kaliaguine, et al., "Catalysis on the Energy Scene" 1984, 403–410, no month.

* cited by examiner

Primary Examiner—Elizabeth D. Wood

(57) ABSTRACT

Aluminum-magnesium silicate- or fluorinated magnesium silicate- aerogels which may be calcined, chemically modified, ion-exchanged, agglomerated, used as a component of a catalyst composition for an addition polymerization; supported versions thereof; and processes for polymerization are disclosed.

10 Claims, No Drawings

ION EXCHANGED ALUMINUM-MAGNESIUM SILICATE OR FLUORINATED MAGNESIUM SILICATE AEROGELS AND CATALYST SUPPORTS THEREFROM

CROSS-REFERENCE

This application is a continuation of U.S. application Ser. No. 09/260,340, filed Mar. 2, 1999, now abandoned, which claims benefit of priority from Provisional Application No. 60/079,442, filed Mar. 26, 1998, the teachings of which are herein incorporated by reference.

FIELD OF THE INVENTION

This invention relates to novel aluminum-magnesium silicate or fluorinated magnesium silicate aerogel materials that are useful, inter alia, as supports for Group 3–10 metal complexes used in the addition polymerization of monomers such as olefins to make high molecular weight homopolymers and copolymers. The materials are also useful as thickening or thixotropic agents for paints or greases, viscosity modifiers for oils and lubricants, ion exchange media, carriers for pigments, and supports for hydrogenation catalysts.

BACKGROUND

It is widely known that addition polymerization processes utilizing metallocene catalysts have been used to produce a wide range of new polymers for use in a variety of applications and products. Supported olefin polymerization catalysts are widely known and used in the gas phase and slurry polymerization of such olefins. Suitable support materials have included silica, alumina, aluminosilicates, clays, and other metal oxides.

In U.S. Pat. No. 5,529,965, and related patents, one type of supported metallocene catalyst is prepared by contacting a support material containing water with an aluminum trialkyl compound to prepare an alumoxane containing support material suitable for use in combination with metallocenes as olefin polymerization catalysts. In U.S. Pat. No. 5,362,825 pillared clays are used to provide supports for transition metal catalysts. The pillared clay is preferably prepared by reacting smectite clay with an aqueous solution of a polymeric cationic hydroxy metal complex, drying the solid product produced and then calcining the product. Preparation of pillared clays, also known as intercalated clays, is described in detail, in U.S. Pat. Nos. 4,248,739, 4,666,887, 4,367,163, 4,271,043, 4,248,739, 4,238,364, 4,216,188 and 4,176,090, among other references. Catalysts for olefin polymerization comprising a metallocene, an ion exchanging compound, especially a clay, and an organic aluminum compound, such as a trialkyl aluminum compound, are disclosed in U.S. Pat. No. 5,308,811. More recently, EP-A-658,576 disclosed the formation of modified clay containing supported catalysts containing a metallocene, wherein an ionic compound, especially a Bronsted acid salt, such as dimethylanilinium chloride, was included in the clay.

Delaminated clays, i.e., clay materials lacking in first order X-ray diffraction pattern and possessing a random orientation of platelets are a known class of materials. One technique for preparing such delaminated clay materials is by freezing an aqueous dispersion of a clay material and subsequently removing the water, such as by freeze drying. Such methods of preparation using non-pillared clays are disclosed in JP-A-01/103908 and JP-A-63/230581. T. J. Pinnavaia, "Preparation and Properties of Pillared and Delaminated Clay Catalysts", *Heterogeneous Catalysts*, B. L. Shapiro, ed., Texas A&M University Press, College Station, Tex., (1984), disclosed a similar method using pillared clay starting materials. A second technique for preparing such delaminated clays using air drying rather than freeze drying is disclosed in U.S. Pat. No. 4,761,391. The teachings of all of the foregoing patents and publications, or their corresponding U.S. equivalent applications, are hereby incorporated by reference.

Despite the advance in the arts resulting from the use of the foregoing inventions and discoveries, it remains desired to provide catalyst supports and catalyst components having improved physical and chemical properties. In particular, a catalyst support or catalyst component for olefin polymerizations lacking in added cocatalytic substances, especially alumoxane or alumoxane type materials or Bronsted acid salts containing non-coordinating anions, are desired in order to reduce catalyst material costs. Especially desired are the use of extremely low density substances lacking in detrimental polar groups or intercalated substances that may react detrimentally with the active metal complexes used in the catalyst formulation.

SUMMARY OF THE INVENTION

According to one embodiment of the present invention there is provided an aluminum-magnesium silicate aerogel or fluorinated magnesium silicate aerogel which has been ion exchanged. The aerogel material of the present invention may also be calcined, chemically modified or functionalized, further ion exchanged, impregnated, coated with any chemical coating, particulated, or otherwise modified according to techniques known in the prior art or not previously known in the art, to adapt the same for particular end uses. It is understood that one or more of the foregoing steps may be performed on the aerogel and the same procedure may be repeated one or more times, in the same or a varied manner without departing from the scope of the present invention. In a preferred embodiment the aerogel is calcined, contacted with a functionalizing agent, treated with a catalyst activating material able to form active polymerization catalysts from group 3–10 metal complexes, and contacted with a group 3–10 metal complex or compound to yield an addition polymerization catalyst composition. If desired, the aerogel, before or after modification in the foregoing manner, can be treated with a propping agent, and/or formed into agglomerated particles in order to provide substantially uniform particle size substrates. When used in a gas phase or slurry polymerization such catalyst compositions are heterogeneous and may be referred to as a supported, polymerization catalyst composition.

In another embodiment of the invention there is provided a support material for use in preparing supported catalysts for addition polymerizations comprising an aluminum-magnesium silicate aerogel or fluorinated magnesium silicate aerogel. In a preferred embodiment the aerogel is in the form of agglomerated particles. Most preferably the aerogel is also ion-exchanged. Accordingly, the present invention also includes a supported addition polymerization catalyst comprising the previously described ion exchanged aluminum-magnesium silicate aerogel or fluorinated magnesium silicate aerogel, which has optionally been calcined, contacted with a functionalizing agent, treated with a catalyst activating material as previously described, treated with a propping agent, and/or agglomerated, and further optionally, treated with one or more group 3–10 metal complexes so as to deposit said complex onto the aerogel, said metal complex being deposited in an amount from 0.00001 to 1,000 mg/g of support.

Finally according to the present invention there is provided a process for polymerizing an addition polymerizable monomer, comprising contacting the monomer or a mixture comprising said monomer, with a composition comprising one or more of the above described addition polymerization catalysts. The use of such supported catalysts results in the highly efficient production of high molecular weight polymers over a wide range of polymerization conditions, especially at elevated temperatures. The present compositions are especially useful for catalyzing the solution phase, gas phase or slurry homopolymerization of ethylene or propylene or the solution phase, gas phase or slurry copolymerization of ethylene/propylene (EP polymers), ethylene/octene (EO polymers), ethylene/styrene (ES polymers) and ethylene/propylene/diene (EPDM polymers) wherein the diene is ethylidenenorbornene, 1,4-hexadiene, or similar nonconjugated diene. The foregoing polymeric materials are useful in the preparation of films for packaging or other uses, foamed structures for cushioning or insulating applications, and the preparation of fibers and solid molded objects.

DETAILED DESCRIPTION OF THE INVENTION

As used herein the term "aerogel" refers to an aluminum-magnesium silicate material or fluorinated magnesium silicate material that has been expanded so as to reduce the bulk density thereof to 1.0 g/cm$^3$ or less. Preferably, the material retains at least a partial lamellar structure. That is, in at least portions of the composition, alternating layers of aluminum silicate and magnesium silicate are found existing in at least two dimensions, however the interlayer spacing thereof may be expanded to from 2 to 100,000 times greater than the spacing of an unexpanded clay material. Thus, the materials are alternatively referred to herein as "lamellar aerogels". Preferred aluminum-magnesium silicate- or fluorinated magnesium silicate- aerogels according to the present invention have a bulk density from 0.5 to 0.0001 g/cm$^3$, most preferably from 0.1 to 0.001 g/cm$^3$.

Although most conveniently prepared from natural or artificial clays, it is understood that the present aerogel materials may be prepared from the individual aluminum silicate and magnesium silicate compounds or mixtures of silicate compounds or by any suitable technique. If prepared from a clay, the type of clay used in the preparation of the aluminum-magnesium silicate aerogel may be any of the 5 recognized classes, classified by the quantity of negative charge in the silicate layers of the clay. These are:

1) biophilite, kaolinite, dickalite or talc clays,
2) smectite clays,
3) vermiculite clays
4) mica, and
5) brittle mica.

Preferred clays are those that possess good proton transfer properties. The above clay materials exist in nature, and also can be synthesized, generally in higher purity than the native material. Any of the naturally occurring or synthetic clay materials may be used in forming the aerogels used in the present invention. Preferred clay materials are smectite clays, including montmorillonite, bidelite, saponite and hectorite or fluoromagnesium silicate. A most preferred clay is montmorillonite clay. Mixtures of the foregoing clays with inorganic silicates, such as sodium silicate, may also be used.

Expanding the silicate layers of the clay or other material can be accomplished by any suitable technique. Preferably, the silicate material is formed into a relatively homogeneous, aqueous dispersion and subsequently dried in a manner to preserve the delaminated or partially delaminated, expanded, structure, most preferably by freeze drying the same. Any other technique that allows the operator to prepare a similar stable, delaminated or partially delaminated, expanded structure, including calcination, may be utilized as well.

The silicate material is desirably ion exchanged, either before or after the foregoing expansion procedure, in order to replace at least a portion of native alkali metal cations or alkaline earth metal cations, especially sodium or magnesium cations, with a cation selected from the group consisting of H$^+$, conjugate acids of Lewis bases, reducible Lewis acid cations, and reducible metal cations. Examples of conjugate acids of Lewis bases include ammonium, phosphonium, sulfonium, and oxonium cations, containing at least one proton. Preferred conjugate acids of Lewis bases are protonated ammonium cations, especially NH$_4^+$. Examples of reducible Lewis acid cations include quaternary ammonium cations, ferrocenium, carbonium and silylium cations. Examples of reducible metal cations include Ag$^+$, Pb$^{+2}$ and Fe$^{+3}$. Any suitable anion, especially halide, nitrate, sulfate or phosphate anions, may be used as a counter anion to the foregoing cations in the exchange process.

After recovery of the aerogel (i.e. following freeze-drying), residual water and organic contaminants are desirably removed and beneficial properties are imparted to the resulting aerogel by calcining the same. Calcining can be accomplished by heating the aerogel, optionally in the presence of an inert gaseous medium, especially nitrogen or argon, for a period of time, preferably from 10 minutes to 48 hours. Desirably the calcination is performed at a temperature from 200 to 800° C., preferably from 400 to 800° C. Desirably the water content of the aerogel following calcining is less than 0.5 percent by weight, more preferably less than 0.1 percent by weight.

Residual hydroxyl or other reactive functionality is also desirably removed, generally by capping or reacting such groups with a chemical modifying agent or functionalizing agent, especially a Lewis acid. Desirably, the residual surface hydroxyl or other reactive functionality content of the aluminum-magnesium silicate aerogel is reduced to a level of less than 1 weight percent, preferably less than 0.1 weight percent. Suitable chemical modifying agents include trihydrocarbylaluminum compounds, trihydrocarbylchlorosilane compounds, and hydrocarbylsiloxane compounds containing from 3 to 20 atoms not counting hydrogen. Preferred reactive materials are those lacking labile protons. Most preferred chemical modifying agents include trialkyl aluminum compounds having from 1 to 10 carbons in each alkyl group and hydrocarbyl silanes or siloxanes wherein the hydrocarbyl substituents contain from 1 to 20 carbon atoms, such as trimethylchlorosilane. The use of silane- or siloxane- chemical modifying agents additionally provides a material which is extremely stable at elevated temperatures. For optimum catalytic activity it is desirable to treat the aerogel material with both the silane- or siloxane- containing chemical modifying agent and a trihydrocarbyl aluminum compound, preferably an aluminum trialkyl having from 1 to 10 carbons in each alkyl group. Preferably, the quantity of chemical modifying agent that is reacted with the aerogel material is from 0.001 to 100 g/g of aerogel, preferably from 0.005 to 0.1 g/g of aerogel. The chemical modifying agent may be added to the aerogel at any time during the synthesis and even added to the catalyst formulation at the time the metal complex catalyst and aerogel are combined.

While not desiring to be bound be any particular theory of operation, it is believed that the aluminum-magnesium silicate- or fluorinated magnesium silicate-aerogel materials of the present invention provide superior catalyst activity due to the increased distance between the silicate layers thereof compared to other supports, thereby increasing the available surface area of the material for catalyst attachment. In addition, the aerogel materials are desirably ultimately impregnated with Bronsted acid salts containing an organic ligand group, especially protonated ammonium salts, preferably tri(hydrocarbyl)ammonium salts, most preferably, N,N-dialkylanilinium salts, which may play a role in causing the aerogel to retain its expanded form. Moreover, the present aerogels are highly oleophilic and exhibit a remarkable ability to absorb or imbibe hydrocarbons, up to levels of 50 times the weight of the aerogel itself, or higher. This property may also benefit access to catalytic active sites contained within the aerogel by hydrocarbon reagents including monomers.

For use in the gas phase polymerization of olefin monomers, the aerogels may be formed into particles by any suitable technique in order to provide a uniformly sized, highly porous, particle. Suitable techniques for forming aerogel particles include agglomerating the aluminum-magnesium silicate aerogel by adding an inorganic binder while the clay is dispersed in water or by partially compacting and comminuting the resulting aerogel material. Uniform particle size agglomerates can be formed by dispersing the same in the form of an oil in water emulsion of uniform particle size and optionally agglomerating to form larger particles prior to removing the water phase. Suitable inorganic binders for the foregoing process include the reaction product of formamide with a water-soluble silicate, such as sodium or potassium silicate. Such a particulated form of the aerogel generally has a greater density than the non-particulated product. Additionally, a particulated form of the supported catalyst may be produced by prepolymerizing one or more olefins using the catalyst and thereafter shaping the resulting prepolymerized catalyst into the desired particle size.

In forming the aerogel particles it may also be desirable to include one or more propping agents in the formulation to prevent excessive loss of pore volume. Suitable propping agents include silicon dioxide and inorganic silicate materials. A preferred propping agent is finely divided silica, such as fumed silica. The size and porosity of the agglomerated aerogel particle may be controlled by the amount of the inorganic binder and propping agent, rate of agitation, temperature, use of a coagulant, and other known techniques.

When used as catalyst supports, the aerogels of the invention beneficially do not require the use of metallocene catalyst activators containing inert non-coordinating anions, especially those containing tetrakis(pentafluorophenyl) borate anions, which are relatively expensive. However the use of such activators is not necessarily proscribed and may be utilized by the skilled artisan without departing from the scope of the present invention.

After preparation of the aerogel, a group 3–10 metal complex or compound is added to form the finished supported polymerization catalyst. Suitable group 3–10 metal complexes or compounds for use in combination with the foregoing supports include any compound or complex of a metal of Groups 3–10 of the Periodic Table of the Elements capable of being activated to polymerize ethylenically unsaturated compounds in combination with the present supports.

In a preferred embodiment, the foregoing steps for preparing the present ion-exchanged, aerogel may be summarized as:

1) dispersing a clay or fluorinated magnesium silicate in water,
2) ion exchanging the dispersed clay or fluorinated magnesium silicate with a cationic material or cation forming material, and
3) drying the dispersion, to provide an aluminum-magnesium silicate aerogel or fluorinated magnesium silicate aerogel.

In the foregoing step 2) a preferred ion exchange material is a strong Bronsted acid, such as hydrochloric acid, or a protonated cationic salt, such as an ammonium salt, especially $NH_4Cl$, or $NH_4NO_3$. Moreover, steps 2) and 3) may be conducted in reverse order without adverse affect.

In the preparation of the aluminum-magnesium silicate aerogel or fluorinated magnesium silicate aerogel for use as a support for catalysts, the following additional steps are preferably performed:
4) optionally calcining the ion-exchanged aerogel,
5) redispersing the ion-exchanged aerogel in an organic liquid,
6) contacting the redispersed, ion-exchanged aerogel with one or more chemical modifying agents able to remove hydroxyl or other reactive surface functionality that would interfere with the catalytic properties of the resulting substance.

In a further preferred embodiment for preparing catalyst compositions including supported catalyst compositions used for addition polymerizations, the following additional steps are desirably performed:
7) optionally forming the aerogel into particulates of relatively uniform particle size,
8) contacting the ion-exchanged aerogel with a group 3–10 metal complex or compound capable of forming a polymerization catalyst, and
9) recovering the resulting supported catalyst.

While the foregoing steps have been enumerated for purposes of differentiation, the skilled artisan will appreciate that it is not necessary for operation of the invention that all such steps be carried out chronologically in the order in which they have been listed.

Examples of suitable metal complexes or compounds for use herein include Group 10 diimine derivatives corresponding to the formula:

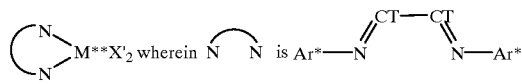

$M^{**}$ is Ni(II) or Pd(II);
X' is halo, hydrocarbyl, or hydrocarbyloxy;
Ar* is an aryl group, especially 2,6-diisopropylphenyl or aniline group; and
CT-CT is 1,2-ethanediyl, 2,3-butanediyl, or form a fused ring system wherein the two T groups together are a 1,8-naphthanediyl group.

Similar compounds to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar commoners such as vinyl chloride, alkyl acrylates and alkyl methacrylates.

Additional complexes or compounds include derivatives of Group 3, 4, or Lanthanide metals which are in the +2, +3, or +4 formal oxidation state. Preferred are those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14–16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, e.g. amide, phosphide, alkyleneoxy or alkylenethio groups bonded to the transition metal or Lanthanide metal, and bonded to the hydrocarbyl group, π-bonded group, or hydrocarbyl- substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(/)phenanthren-1-yl, and tetrahydroindenyl.

The boratabenzenes are anionic ligands which are boron containing analogues to benzene. They are previously known in the art having been described by G. Herberich, et al., in *Organometallics*, 14,1, 471–480 (1995). Preferred boratabenzenes correspond to the formula:

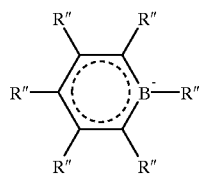

wherein R" is selected from the group consisting of hydrogen, hydrocarbyl, silyl, or germyl, said R" having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

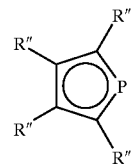

wherein R" is as previously defined.

Phosphinimine/ cyclopentadienyl complexes are disclosed in EP-A-890581 and correspond to the formula $[(R^{})_3-P=N]_bM^{}(Cp)(L^1)_{3-b}$, wherein:

R is a monovalent ligand, illustrated by hydrogen, halogen, or hydrocarbyl, or two R groups together form a divalent ligand, M** is a Group 4 metal, Cp is cyclopentadienyl, or similar delocalized π-bonded group, $L^1$ is a monovalent ligand group, illustrated by hydrogen, halogen or hydrocarbyl, and b is 1 or 2.

A further suitable class of transition metal complexes for use herein correspond to the formula:

$$K'_kMZ'_mL_lX_p, \text{ or a dimer thereof,}$$

wherein:

K' is an anionic group containing delocalized π-electrons through which K' is bound to M, said K' group containing up to 50 atoms not counting hydrogen atoms, optionally two K' groups may be joined together forming a bridged structure, and further optionally one K' may be bound to Z';

M is a metal of Group 4 of the Periodic Table of the Elements in the +2, +3 or +4 formal oxidation state;

Z' is an optional, divalent substituent of up to 50 non-hydrogen atoms that together with K forms a metallocycle with M;

L is an optional neutral ligand having up to 20 non-hydrogen atoms;

X each occurrence is a monovalent, anionic moiety having up to 40 non-hydrogen atoms, optionally, two X groups may be covalently bound together forming a divalent dianionic moiety having both valences bound to M, or, optionally 2 X groups may be covalently bound together to form a neutral, conjugated or non-conjugated diene that is bound to M by means of delocalized π-electrons (whereupon M is in the +2 oxidation state), or further optionally one or more X and one or more L groups may be bonded together thereby forming a moiety that is both covalently bound to M and coordinated thereto by means of Lewis base functionality;

k is 0, 1 or 2;
m is 0 or 1;
l is a number from 0 to 3;
p is an integer from 0 to 3; and
the sum, k+m+p, is equal to the formal oxidation state of M, except when 2x groups together form a neutral conjugated or non-conjugated diene that is bound to M via delocalized π-electrons, in which case the sum k+m is equal to the formal oxidation state of M.

Preferred complexes include those containing either one or two K' groups. The latter complexes include those containing a bridging group linking the two K' groups. Preferred bridging groups are those corresponding to the formula $(ER'_2)_x$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and x is 1 to 8. Preferably, R' independently each occurrence is methyl, ethyl, propyl, benzyl, tert-butyl, phenyl, methoxy, ethoxy or phenoxy.

Examples of the complexes containing two K' groups are compounds corresponding to the formula:

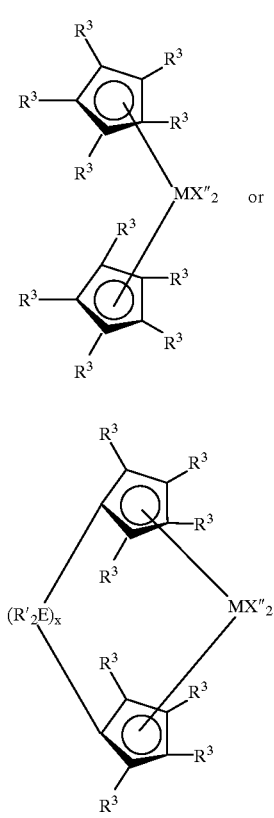

wherein:
M is titanium, zirconium or hafnium, preferably zirconium or hafnium, in the +2 or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded ligand groups, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl) (octahydrofluoren-1-yl)silane, dimethyl(cyclopentadienyl)(tetrahydrofluoren-1-yl)silane, (1,1,2,2-tetramethy)-1,2-bis(cyclopentadienyl)disilane, (1,2-bis(cyclopentadienyl)ethane, and dimethyl (cyclopentadienyl)-1-(fluoren-1-yl) methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula $K'_kMZ'_mL_nX_p$, or a dimer thereof, wherein Z' is a divalent substituent of up to 50 non-hydrogen atoms that together with K' forms a metallocycle with M.

Preferred divalent Z' substituents include groups containing up to 30 non-hydrogen atoms comprising at least one atom that is oxygen, sulfur, boron or a member of Group 14 of the Periodic Table of the Elements directly attached to K', and a different atom, selected from the group consisting of nitrogen, phosphorus, oxygen or sulfur that is covalently bonded to M.

Another preferred class of Group 4 metal complexes used according to the present invention corresponds to the formula:

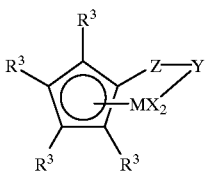

wherein:
M is titanium or zirconium, preferably titanium in the +2, +3, or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system,
each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;
Y is —O—, —S—, —NR'—, —PR'—; and
Z is $SiR'_2$, $CR'_2$, $SiR'_2SiR'_2$, $CR'_2CR'_2$, $CR'=CR'$, $CR'_2SiR'_2$, or $GeR'_2$, wherein R' is as previously defined.

Illustrative Group 4 metal complexes that may be employed in the practice of the present invention include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-dimethylpentadienyl,
cyclopentadienyltitanium-2,4-dimethylpentadienyl•triethylphosphine,
cyclopentadienyllitanium-2,4-dimethylpentadienyl•trimethylphosphine,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
bis($\eta^5$-2,4-dimethylpentadienyl)titanium,
bis($\eta^5$-2,4-dimethylpentadienyl)titanium•trimethylphosphine,
bis($\eta^5$-2,4-dimethylpentadienyl)titanium•triethylphosphine,
octahydrofluorenyltitaniumtrimethyl,
tetrahydroindenyltitaniumtrimethyl,
tetrahydrofluorenyltitaniumtrimethyl,
(tert-butylamido)(1,1-dimethyl-2,3,4,9,10-$\eta$-1,4,5,6,7,8-hexahydronaphthalenyl)dimethylsilanetitaniumdimethyl,
(tert-butylamido)(1,1,2,3-tetramethyl-2,3,4,9,10-$\eta$-1,4,5,6,7,8-hexahydronaphthalenyl)dimethylsilanetitaniumdimethyl,
(tert-butylamido)(tetramethyl-$\eta^5$-cyclopentadienyl) dimethylsilanetitanium dibenzyl,
(tert-butylamido)(tetramethyl-$\eta^5$-cyclopentadienyl) dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl) dimethylsilanetitanium dimethyl,
(tert-butylamido)(tetramethyl-$\eta^5$-cyclopentadienyl) dimethylsilane titanium (III) 2-(dimethylamino)benzyl;
(tert-butylamido)(tetramethyl-$\eta^5$-cyclopentadienyl) dimethylsilanetitanium (III) allyl,
(tert-butylamido)(tetramethyl-$\eta^5$-cyclopentadienyl) dimethylsilanetitanium (III) 2,4-dimethylpentadienyl,
(tert-butylamido)(tetramethyl-$\eta^5$-cyclopentadienyl) dimethylsilanetitanium (II) 1,4-diphenyl-1,3-butadiene,
(tert-butylamido)(tetramethyl-$\eta^5$-cyclopentadienyl) dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl) dimethylsilanetitanium (IV) 2,3-dimethyl-1,3-butadiene,
(tert-butylamido)(2,3-dimethylindenyl) dimethylsilanetitanium (IV) isoprene
(tert-butylamido)(2,3-dimethylindenyl) dimethylsilanetitanium (IV) dimethyl
(tert-butylamido)(2,3-dimethylindenyl) dimethylsilanetitanium (IV) dibenzyl
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido)(2,3-dimethylindenyl) dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl) dimethylsilanetitanium (II) 1,4-diphenyl-1,3-butadiene,
(tert-butylamido)(2-methyl-4-phenylindenyl) dimethylsilanetitanium (II) 1,3-pentadiene,
(tert-butylamido)(2-methyl-4-phenylindenyl) dimethylsilanetitanium (II) 2,4-hexadiene,
(tert-butylamido)(tetramethyl-$\eta^5$-cyclopentadienyl) dimethyl-silanetitanium (IV) 1,3-butadiene,
(tert-butylamido)(tetramethyl-$\eta^5$-cyclopentadienyl) dimethylsilanetitanium (IV) 2,3-dimethyl-1,3-butadiene,
(tert-butylamido)(tetramethyl-$\eta^5$-cyclopentadienyl) dimethylsilanetitanium (IV) isoprene,
(tert-butylamido)(tetramethyl-$\eta^5$-cyclopentadienyl) dimethyl-silanetitanium (II) 1,4-dibenzyl-1,3-butadiene,
(tert-butylamido)(tetramethyl-$\eta^5$-cyclopentadienyl) dimethylsilanetitanium (II) 2,4-hexadiene,
(tert-butylamido)(tetramethyl-$\eta^5$-cyclopentadienyl) dimethyl-silanetitanium (II) 3-methyl-1,3-pentadiene,
(tert-butylamido)(2,4-dimethylpentadien-3-yl) dimethylsilanetitaniumdimethyl,
(tert-butylamido)(6,6-dimethylcyclohexadienyl) dimethylsilanetitaniumdimethyl,
(tert-butylamido)(1,1-dimethyl-2,3,4,9,10-$\eta$-1,4,5,6,7,8-hexahydronaphthalen-4-yl) dimethylsilanetitaniumdimethyl, (tert-butylamido)(1,1,2,3-tetramethyl-2,3,4,9,10-η-1,4,5,6,
7,8-hexahydronaphthalen-4-yl)
dimethylsilanetitaniumdimethyl
(tert-butylamido)(tetramethyl-η$^5$-cyclopentadienyl methylphenylsilanetitanium (IV) dimethyl,
(tert-butylamido)(tetramethyl-η5-cyclopentadienyl methylphenylsilanetitanium (II) 1,4-diphenyl-1,3-butadiene,
1-(tert-butylamido)-2-(tetramethyl-η$^5$-cyclopentadienyl) ethanediyltitanium (IV) dimethyl, and
1-(tert-butylamido)-2-(tetramethyl-η$^5$-cyclopentadienyl) ethanediyl-titanium (II) 1,4-diphenyl-1,3-butadiene.

Complexes containing two K' groups including bridged complexes suitable for use in the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl) zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilyl-bis(cyclopentadienyl)zirconiumdimethyl,
dimethylsilyl-bis(tetramethylcyclopentadienyl)titanium (III) allyl
dimethylsilyl-bis(t-butylcyclopentadienyl) zirconiumdichloride,
dimethylsilyl-bis(n-butylcyclopentadienyl) zirconiumdichloride,
(methylene-bis(tetramethylcyclopentadienyl)titanium(III) 2-(dimethylamino)benzyl,
(methylene-bis(n-butylcyclopentadienyl)titanium(III) 2-(dimethylamino)benzyl,
dimethylsilyl-bis(indenyl)zirconiumbenzylchloride,
dimethylsilyl-bis(2-methylindenyl)zirconiumdimethyl,
dimethylsilyl-bis(2-methyl-4-phenylindenyl) zirconiumdimethyl,
dimethylsilyl-bis(2-methylindenyl)zirconium-1,4-diphenyl-1,3-butadiene,
dimethylsilyl-bis(2-methyl-4-phenylindenyl)zirconium (II) 1,4-diphenyl-1,3-butadiene,
dimethylsilyl-bis(tetrahydroindenyl)zirconium(II) 1,4-diphenyl-1,3-butadiene,
dimethylsilyl-bis(fluorenyl)zirconiummethylchloride,
dimethylsilyl-bis(tetrahydrofluorenyl)zirconium bis (trimethylsilyl),
(isopropylidene)(cyclopentadienyl)(fluorenyl) zirconiumdibenzyl, and
dimethylsilyl(tetramethylcyclopentadienyl)(fluorenyl) zirconium dimethyl.

Other complexes, especially those containing other Group 4 metals, will, of course, be apparent to those skilled in the art.

The complexes are combined with the aerogel by any suitable technique. Ideally they are deposited from solution in an aliphatic, cycloaliphatic or aromatic liquid, by contacting the same with a solution of the metal complex and removing the solvent. They may be immersed in the metal complex solution, or the solution may be coated, or sprayed onto the surface of the support. Preferably, the liquid is thereafter removed or substantially removed.

Although not preferred, it is also within the scope of the present invention to include a known cocatalyst in the catalyst formulation. Suitable cocatalysts for use herein include polymeric or oligomeric alumoxanes, especially methylalumoxane, triisobutyl aluminum modified methylalumoxane, or isobutylalumoxane, which may be generated in situ by reaction of e.g., a trialkylaluminum compound with water contained on the clay if desired. Additional suitable activating cocatalysts include Lewis acids, such as $C_{1-30}$ hydrocarbyl substituted Group 13 compounds, especially tri(hydrocarbyl)aluminum- or tri (hydrocarbyl)boron compounds and halogenated (including perhalogenated) derivatives thereof, having from 1 to 20 carbons in each hydrocarbyl or halogenated hydrocarbyl group, more especially perfluorinated tri(aryl)boron compounds, and most especially tris(pentafluorophenyl) borane; nonpolymeric, compatible, noncoordinating, ion forming compounds (including the use of such compounds under oxidizing conditions), especially the use of ammonium-, phosphonium-, oxonium-, carbonium-, silylium-, sulfonium-, or ferrocenium- salts of compatible, noncoordinating anions; and combinations of the foregoing activating cocatalysts and techniques. The foregoing activating cocatalysts and activating techniques have been previously taught with respect to different metal complexes in the following references: U.S. Pat. Nos. 5,132,380, 5,153, 157, 5,064,802, 5,321,106, 5,721,185, 5,350,723, and WO-97/04234, equivalent to U.S. Ser. No. 08/818,530, filed Mar. 14, 1997, the teachings of which are hereby incorporated by reference.

Combinations of neutral Lewis acids, especially the combination of a trialkyl aluminum compound having from 1 to 4 carbons in each alkyl group and a halogenated tri (hydrocarbyl)boron compound having from 1 to 20 carbons in each hydrocarbyl group, especially tris (pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts. Preferred molar ratios of Group 4 metal complex:tris(pentafluorophenylborane:alumoxane are from 1:1:1 to 1:5:5, more preferably from 1:1:1.5 to 1:5:3.

Suitable ion forming compounds useful as cocatalysts in one embodiment of the present invention (but not a preferred embodiment) comprise a cation which is a Bronsted acid capable of donating a proton, and a compatible, noncoordinating anion, $A'^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a Lewis base such as olefin monomer. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred non-coordinating anions are those containing a single or multiple coordination complex which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

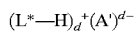

wherein:

L* is a neutral Lewis base;

(L*—H)$^+$ is a Bronsted acid;

A$^{'d-}$ is a noncoordinating, compatible anion having a charge of d–, and d is an integer from 1 to 3.

More preferably A$^{'d-}$ corresponds to the formula: [M*Q$_4$]$^-$;

wherein:

M* is boron or aluminum in the +3 formal oxidation state; and

Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal substituted-hydrocarbyl, organometalloid substituted-hydrocarbyl, halohydrocarbyloxy, halohydrocarbyloxy substituted hydrocarbyl, halocarbyl- substituted hydrocarbyl, and halo- substituted silylhydrocarbyl radicals (including perhalogenated hydrocarbyl- perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, that is, the counter ion has a single negative charge and is A$^{1-}$. Activating cocatalysts comprising boron which are particularly useful in the preparation of catalysts of this invention may be represented by the following general formula:

wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl- group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl)borate,
methyldioctadecylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-diethylanilinium tetrakis(2,3,4,6-tetrafluorophenyl)borate, and
N,N-dimethyl-(2,4,6-trimethylanilinium) tetrakis-(2,3,4,6-tetrafluorophenyl)borate.

Dialkyl ammonium salts such as:
dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis(pentafluorophenyl)borate and methyldi(tetradecyl)-ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

Another suitable ammonium salt, especially for use in heterogeneous catalyst systems is formed upon reaction of a organometal compound, especially a tri($C_{1-6}$alkyl) aluminum compound with an ammonium salt of a hydroxyaryltris(fluoroaryl)borate compound. The resulting compound is an organometaloxyaryltris(fluoroaryl)borate compound which is generally insoluble in aliphatic liquids. Typically, such compounds are advantageously precipitated onto the present aerogel materials to form a supported cocatalyst mixture. Examples of suitable compounds include the reaction product of a tri($C_{1-6}$ alkyl)aluminum compound with the ammonium salt of hydroxyaryltris(aryl)borate. Suitable hydroxyaryltris(aryl)-borates include the ammonium salts, especially the forgoing long chain alkyl ammonium salts of:

(4-dimethylaluminumoxy-1-phenyl)tris(pentafluorophenyl) borate,
(4-dimethylaluminumoxy-3,5-di(trimethylsilyl)-1-phenyl) tris(pentafluorophenyl)borate,
(4-dimethylaluminumoxy-3,5-di(t-butyl)-1-phenyl)tris (pentafluorophenyl)borate,
(4-dimethylaluminumoxy-1-benzyl)tris(pentafluorophenyl) borate,
(4-dimethylaluminumoxy-3-methyl-1-phenyl)tris (pentafluorophenyl)borate,
(4-dimethylaluminumoxy-tetrafluoro-1-phenyl)tris (pentafluorophenyl)borate,
(5-dimethylaluminumoxy-2-naphthyl)tris (pentafluorophenyl)borate,
4-(4-dimethylaluminumoxy-1-phenyl)phenyltris (pentafluorophenyl)borate,
4-(2-(4-(dimethylaluminumoxyphenyl)propane-2-yl) phenyloxy)tris(pentafluorophenyl)borate,
(4-diethylaluminumoxy-1-phenyl)tris(pentafluorophenyl) borate,
(4-diethylaluminumoxy-3,5-di(trimethylsilyl)-1-phenyl)tris (pentafluorophenyl)borate,
(4-diethylaluminumoxy-3,5-di(t-butyl)-1-phenyl)tris (pentafluorophenyl)borate,
(4-diethylaluminumoxy-1-benzyl)tris(pentafluorophenyl) borate,
(4-diethylaluminumoxy-3-methyl-1-phenyl)tris (pentafluorophenyl)borate,
(4-diethylaluminumoxy-tetrafluoro-1-phenyl)tris (pentafluorophenyl)borate,
(5-diethylaluminumoxy-2-naphthyl)tris(pentafluorophenyl) borate,
4-(4-diethylaluminumoxy-1-phenyl)phenyltris (pentafluorophenyl)borate,
4-(2-(4-(diethylaluminumoxyphenyl)propane-2-yl) phenyloxy)tris(pentafluorophenyl)borate,
(4-diisopropylaluminumoxy-1-phenyl)tris (pentafluorophenyl)borate,
(4-diisopropylaluminumoxy-3,5-di(trimethylsilyl)-1-phenyl)tris(pentafluorophenyl)borate,
(4-diisopropylaluminumoxy-3,5-di(t-butyl)-1-phenyl)tris (pentafluorophenyl)borate,
(4-diisopropylaluminumoxy-1-benzyl)tris (pentafluorophenyl)borate,
(4-diisopropylaluminumoxy-3-methyl-1-phenyl)tris (pentafluorophenyl)borate,
(4-diisopropylaluminumoxy-tetrafluoro-1-phenyl)tris (pentafluorophenyl)borate,
(5-diisopropylaluminumoxy-2-naphthyl)tris (pentafluorophenyl)borate,
4-(4-diisopropylaluminumoxy-1-phenyl)phenyltris (pentafluorophenyl)borate, and
4-(2-(4-(diisopropylaluminumoxyphenyl)propane-2-yl) phenyloxy)tris(pentafluorophenyl)borate.

An especially preferred ammonium compound is methylditetradecylammonium (4-diethylaluminumoxy-1-phenyl) tris(pentafluorophenyl)borate, methyldihexadecylammonium (4-diethylaluminumoxy-1-phenyl)tris (pentafluorophenyl)borate, methyldioctadecyl-ammonium (4-diethylaluminumoxy-1-phenyl)tris(pentafluorophenyl) borate, and mixtures thereof. The foregoing complexes are disclosed in WO96/28480, which is equivalent to U.S. Ser. No. 08/610,647, filed Mar. 4, 1996, and in U.S. Ser. No. 08/768,518, filed Dec. 18, 1996, the teachings of which are incorporated by reference herein.

Another suitable ion forming, activating cocatalyst comprises a salt of a cationic oxidizing agent and a noncoordinating, compatible anion represented by the formula:

$$(Ox^{e+})_d(A'^{d-})_e,$$

wherein
Ox$^{e+}$ is a cationic oxidizing agent having a charge of e+;
d and e are integers from 1 to 3; and
A$'^{d-}$ is a non-coordinating anion of charge d$^-$.

Examples of cationic oxidizing agents include: ferrocenium, hydrocarbyl-substituted ferrocenium, Ag$^{+,}$ or Pb$^{+2}$. Preferred embodiments of A$'^{d-}$ are those anions previously defined with respect to the Bronsted acid containing activating cocatalysts, especially tetrakis (pentafluorophenyl)borate.

Another suitable ion forming, activating cocatalyst comprises a compound which is a salt of a carbenium ion and a noncoordinating, compatible anion represented by the formula:

$$\text{ⓒ}^+A'^-$$

wherein:
ⓒ$^+$ is a $C_{1-20}$ carbenium ion; and
A$'^-$ is a noncoordinating, compatible anion having a charge of −1. A preferred carbenium ion is the trityl cation, i.e. triphenylmethylium.

A further suitable ion forming, activating cocatalyst comprises a compound which is a salt of a silylium ion and a noncoordinating, compatible anion represented by the formula:

$$R_3Si(X')A'^-$$

wherein:
R is $C_{1-10}$ hydrocarbyl;
X' is hydrogen or R; and
A$'^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. Pat. No. 5,625,087, the teachings of which are hereby incorporated by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The molar ratio of metal complex/cocatalyst, if a cocatalyst is employed, preferably ranges from 1:10,000 to 10:1, more preferably from 1:5000 to 10:1, most preferably from 1:1000 to 1:1. Alumoxane, when used by itself as an activating cocatalyst, is preferably employed in large molar ratio, generally at least 100 times the quantity of metal complex on a molar basis. Tris(pentafluorophenyl)borane, where used as an activating cocatalyst is preferably employed in a molar ratio to the metal complex of form 0.5:1 to 10:1, more preferably from 1:1 to 6:1 most preferably from 1:1 to 5:1. The remaining activating cocatalysts are generally preferably employed in approximately equimolar quantity with the metal complex.

The catalysts may be used to polymerize ethylenically and/or acetylenically unsaturated monomers having from 2 to 100,000 carbon atoms either alone or in combination. Preferred monomers include the $C_{2-20}$ α-olefins especially ethylene, propylene, isobutylene, 1-butene, 1-pentene, 1-hexene, 3-methyl-1-pentene, 4-methyl-1-pentene, 1-octene, 1-decene, long chain macromolecular α-olefins, and mixtures thereof. Other preferred monomers include styrene, $C_{1-4}$ alkyl substituted styrene, tetrafluoroethylene, vinylbenzocyclobutane, ethylidenenorbornene, 1,4-hexadiene, 1,7-octadiene, vinylcyclohexane, 4-vinylcyclohexene, divinylbenzene, and mixtures thereof with ethylene. Long chain macromolecular α-olefins are vinyl terminated polymeric remnants formed in situ during continuous solution polymerization reactions. Under suitable processing conditions such long chain macromolecular units are readily polymerized into the polymer product along with ethylene and other short chain olefin monomers to give small quantities of long chain branching in the resulting polymer. Most preferably the present supported catalysts are used in the polymerization of propylene to prepare polypropylene having a high degree of isotacticity. Preferred isotactic polypropylene polymers produced using the present supported catalysts have an isotacticity as measured by $^{13}C$ NMR spectroscopy of at least 80 percent, preferably at least 90 percent, and most preferably at least 95 percent.

In general, the polymerization may be accomplished at conditions well known in the prior art for Ziegler-Natta or Kaminsky-Sinn type polymerization reactions, such as temperatures from 0–250° C. and pressures from atmospheric to 1000 atmospheres (0.1 to 100 MPa). Slurry or gas phase process conditions are most desired. The support is preferably employed in an amount to provide a weight ratio of catalyst (based on metal):support from 1:100,000 to 1:10, more preferably from 1:50,000 to 1:20, and most preferably from 1:10,000 to 1:30. Suitable gas phase reactions may utilize condensation of the monomer or monomers employed in the reaction, or of an inert diluent to remove heat from the reactor.

In most polymerization reactions the molar ratio of catalyst:polymerizable compounds employed is from $10^{-12}$:1 to $10^{-1}$:1, more preferably from $10^{-12}$:1 to $10^{-5}$:1.

Suitable diluents for polymerization via a slurry process are noncoordinating, inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and aromatic and alkyl-substituted aromatic compounds such as benzene, toluene, and xylene. Suitable diluents also include liquid olefins which may act as monomers or comonomers including ethylene, propylene, 1-butene, butadiene, cyclopentene, 1-hexene, 3-methyl-1-pentene, 4-methyl-1-pentene, 1,4-hexadiene, 1,7-octadiene, 1-octene, 1-decene, styrene, divinylbenzene, ethylidenenorbornene, allylbenzene, vinyltoluene (including all isomers alone or in admixture), 4-vinylcyclohexene, and vinylcyclohexane. Mixtures of the foregoing are also suitable.

The catalysts may also be utilized in combination with at least one additional homogeneous or heterogeneous polymerization catalyst in the same or in separate reactors connected in series or in parallel to prepare polymer blends having desirable properties.

The present catalyst compositions are advantageously employed in a process for preparing homopolymers of propylene, random or block copolymers of propylene and an olefin selected from the group consisting of ethylene, $C_{4-10}$ olefins, and $C_{4-10}$ dienes, and random terpolymers of propylene and olefins selected from the group consisting of ethylene and $C_{4-10}$ olefins. The $C_{4-10}$ olefins include the linear and branched olefins such as, for example, 1-butene, isobutylene, 1-pentene, 3-methyl-1-butene, 1-hexene, 3,4-dimethyl-1-butene, 1-heptene, and 3-methyl-1-hexene. Examples of $C_{4-10}$ dienes include 1,3-butadiene, 1,4-pentadiene, isoprene, 1,5-hexadiene, and 2,3-dimethyl-1,3-hexadiene.

Preferred polypropylene products have a molecular weight (Mw) of at least 10,000, more preferably at least 50,000, and most preferably at least 100,000, and a molecular weight distribution, Mw/Mn of less than 6.0, more preferably less than 4.0, and most preferably less than 2.5.

The polymerization is generally conducted under continuous or semicontinuous slurry polymerization conditions in hydrocarbon diluents such as propylene, propane, butene, butene-2, isobutane, hexane, heptane, and mixtures of the foregoing, generally at temperatures from 50 to 100° C., and pressures from atmospheric to 1 MPa. The polymerization may be conducted in one or more continuous stirred tank tubular reactors or fluidized bed, gas phase reactors, or both, connected in series or parallel. Condensed monomer or solvent may be added to the gas phase reactor as is well known in the art. The supported catalyst may also be prepolymerized prior to use as previously disclosed.

In a continuous reaction system, the reaction mixture is typically maintained at conditions at which the polymer is produced as a slurry of powder in the reaction mixture. Use of highly active and highly stereospecific catalyst systems in propylene polymerization substantially eliminates the need to remove catalyst components or atactic polymer from the polymer product. The mixture of reaction components is fed continuously or at frequent intervals into the reactor system and is continuously monitored so as to ensure an efficient reaction and the desired product. For example, it is well known that supported coordination catalysts and catalyst systems of the type described above are highly sensitive, in varying degrees, to catalyst poisons such as water, oxygen, carbon oxides, acetylenic compounds and sulfur compounds. Introduction of such compounds may result in reactor upset and production of off-grade product. Typically, computer control systems are used to maintain process variables within acceptable limits, often by measuring polymer variables such as viscosity, density and tacticity, or catalyst productivity.

In the process, reactants and diluents, which may be a mixture of propylene, hydrogen, nitrogen, unreacted comonomers and inert hydrocarbons, are continuously recycled through the reactor, optionally with scavenging to remove impurities and condensation to remove the heat of polymerization. Catalyst and cocatalysts, fresh monomer or comonomer(s) and selectivity control agents, branching agents or chain transfer agents, if desired, are likewise continuously fed to the reactor. The polymer product is continuously or semi-continuously removed and volatile components removed and recycled. Suitable processes for preparing polypropylene polymers are known in the art and illustrated by those taught in U.S. Pat. Nos. 4,767,735, 4,975,403, and 5,084,513, among others.

Utilizing the catalysts of the present invention, copolymers having high comonomer incorporation and correspondingly low density, yet having a low melt index, may be readily prepared. Additionally, high molecular weight polymers are readily attained by use of the present catalysts, even at elevated reactor temperatures. This result is highly desirable because the molecular weight of α-olefin copolymers can be readily reduced by the use of hydrogen or similar chain transfer agent, however increasing the molecular weight of α-olefin copolymers is usually only attainable by reducing the polymerization temperature of the reactor. Disadvantageously, operation of a polymerization reactor at reduced temperatures significantly increases the cost of operation since heat must be removed from the reactor to maintain the reduced reaction temperature, while at the same time heat must be added to the reactor effluent to vaporize the solvent. In addition, productivity is increased due to improved polymer solubility, decreased solution viscosity, and a higher polymer concentration. Utilizing the present catalysts, α-olefin homopolymers and copolymers having densities from 0.85 g/cm$^3$ to 0.96 g/cm$^3$, and melt flow rates from 0.001 to 10.0 dg/min are readily attained in a high temperature process.

The catalysts of the present invention are particularly advantageous for the production of ethylene homopolymers and ethylene/α-olefin copolymers having high levels of long chain branching. The use of the catalysts of the present invention in continuous polymerization processes, especially continuous, solution polymerization processes, allows for elevated reactor temperatures which favor the formation of vinyl terminated polymer chains that may be incorporated into a growing polymer, thereby giving a long chain branch. The use of the present catalysts system advantageously allows for the economical production of ethylene/α-olefin copolymers having processability similar to high pressure, free radical produced low density polyethylene.

The present supported catalysts may be advantageously employed to prepare olefin polymers having improved processing properties by polymerizing ethylene alone or ethylene/α-olefin mixtures with low levels of a "H" branch inducing diene, such as norbornadiene, 1,7-octadiene, or 1,9-decadiene. The unique combination of elevated reactor temperatures, high molecular weight (or low melt indices) at high reactor temperatures and high comonomer reactivity advantageously allows for the economical production of polymers having excellent physical properties and processability. Preferably such polymers comprise ethylene, a $C_{3-20}$ α-olefin and a "H"-branching comonomer.

The present supported catalysts are also well suited for the preparation of EP and EPDM copolymers in high yield and productivity. The process employed is preferably a slurry process such as that disclosed in U.S. Pat. No. 5,229,478.

In general terms, it is desirable to produce such EP and EPDM elastomers under conditions of increased reactivity of the diene monomer component. The reason for this was explained in the above identified '478 patent in the following manner, which still remains true despite the advances attained in such reference. A major factor affecting production costs and hence the utility of an EPDM is the diene monomer cost. The diene is a more expensive monomer material than ethylene or propylene. Further, the reactivity of diene monomers with previously known metallocene catalysts is lower than that of ethylene and propylene. Consequently, to achieve the requisite degree of diene incorporation to produce an EPDM with an acceptably fast cure rate, it has been necessary to use a diene monomer concentration which, expressed as a percentage of the total concentration of monomers present, is in substantial excess compared to the percentage of diene desired to be incorporated into the final EPDM product. Since substantial amounts of unreacted diene monomer must be recovered from the polymerization reactor effluent for recycle, the cost of production is increased unnecessarily.

Further adding to the cost of producing an EPDM is the fact that, generally, the exposure of an olefin polymerization catalyst to a diene, especially the high concentrations of diene monomer required to produce the requisite level of diene incorporation in the final EPDM product, often reduces the rate or activity at which the catalyst will cause polymerization of ethylene and propylene monomers to proceed. Correspondingly, lower throughputs and longer reaction times have been required, compared to the production of an ethylene-propylene copolymer elastomer or other α-olefin copolymer elastomer.

The present catalyst system advantageously allows for increased diene reactivity thereby preparing EPDM polymers in high yield and productivity. Additionally, the supported catalysts of the present invention achieve the economical production of EPDM polymers with diene contents of up to 20 weight percent or higher, which polymers possess highly desirable fast cure rates.

The non-conjugated diene monomer can be a straight chain, branched chain or cyclic hydrocarbon diene having from about 6 to about 15 carbon atoms. Examples of suitable non-conjugated dienes are straight chain acyclic dienes such as 1,4-hexadiene and 1,6-octadiene: branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene: single ring alicyclic dienes such as 1,3-cyclopentadiene; 1,4-cyclohexadiene; 1,5-cyclooctadiene and 1,5-cyclododecadiene: and multi-ring alicyclic fused and bridged ring dienes such as tetrahydroindene, methyl tetrahydroindene, dicyclopentadiene; bicyclo-(2,2,1)-hepta-2,5-diene; alkenyl, alkylidene, cycloalkenyl and cycloalkylidene norbornenes such as 5-methylene-2-norbornene (MNB); 5-propenyl-2-norbornene,5-isopropylidene-2-norbornene,5-(4-cyclopentenyl)-2-norbornene,5-cyclohexylidene-2-norbornene, 5-vinyl-2-norbornene and norbornadiene.

Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

The preferred EPDM elastomers may contain about 20 up to about 90 weight percent ethylene, more preferably about 30 to 85 weight percent ethylene, most preferably about 35 to about 80 weight percent ethylene.

The alpha-olefins suitable for use in the preparation of elastomers with ethylene and dienes are preferably $C_{3-16}$ alpha-olefins. Illustrative non-limiting examples of such alpha-olefins are propylene, 1-butene, 1-pentene, 1-hexene, 1-octene, 1-decene, and 1-dodecene. The alpha-olefin is generally incorporated into the EPDM polymer at about 10 to about 80 weight percent, more preferably at about 20 to about 65 weight percent. The non-conjugated dienes are generally incorporated into the EPDM at about 0.5 to about 20 weight percent; more, preferably at about 1 to about 15 weight percent, and most preferably at 3 to about 12 weight percent. If desired, more than one diene may be incorporated simultaneously, for example HD and ENB, with total diene incorporation within the limits specified above.

At all times, the individual ingredients as well as the catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

Ethylene is generally added to the reaction vessel in an amount to maintain a differential pressure in excess of the combined vapor pressure of the $\alpha$-olefin and diene monomers. The ethylene content of the polymer is determined by the ratio of ethylene differential pressure to the total reactor pressure. Generally the polymerization process is carried out with a differential pressure of ethylene of from about 10 to about 1000 psi (70 to 7000 kPa), most preferably from about 40 to about 400 psi (30 to 300 kPa). The polymerization is generally conducted at a temperature of from 25 to 200° C., preferably from 75 to 170° C., and most preferably from greater than 95 to 140° C.

The polymerization may be carried out as a batchwise or a continuous polymerization process A continuous process is preferred, in which event supported catalyst, ethylene, $\alpha$-olefin, and optionally diluent and diene are continuously supplied to the reaction zone and polymer product continuously removed therefrom.

The present supported catalysts may also be employed to advantage in the gas phase copolymerization of olefins. Gas phase processes for the polymerization of olefins, especially the homopolymerization and copolymerization of ethylene and propylene, and the copolymerization of ethylene with higher $\alpha$-olefins such as, for example, 1-butene, 1-hexene, 4-methyl-1-pentene are well known in the cooling provided by the cooled the recycle gas, is to feed a volatile liquid to the bed to provide an evaporative cooling effect. The volatile liquid employed in this case can be, for example, a volatile inert liquid, for example, a saturated hydrocarbon having about 3 to about 8, preferably 4 to 6, carbon atoms. In the case that the monomer or comonomer itself is a volatile liquid (or can be condensed to provide such a liquid) this can be suitably be fed to the bed to provide an evaporative cooling effect. Examples of olefin monomers which can be employed in this manner are olefins containing about three to about eight, preferably three to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP 89691; U.S. Pat. No. 4,543,399; WO 94/25495 and U.S. Pat. No. 5,352,749, which patents, publications or corresponding equivalent U.S. applications are hereby incorporated by reference. A particularly preferred method of recycling the liquid to the bed is to separate the liquid from the recycle gas stream and to reinject this liquid directly into the bed, preferably using a method which generates fine droplets of the liquid within the bed. This type of process is described in WO 94/28032, which publication or the corresponding U.S. application is hereby incorporated by reference.

The polymerization reaction occurring in the gas fluidized bed is catalyzed by the continuous or semi-continuous addition of catalyst. Such catalyst can be prepolymerized as described above, if desired.

The polymer is produced directly in the fluidized bed by catalyzed copolymerization of the monomer and one or more comonomers on the fluidized particles of supported catalyst within the bed. Start-up of the polymerization reaction is achieved using a bed of preformed polymer particles, which are preferably similar to the target polyolefin. Such processes are used commercially on a large scale for the manufacture of high density polyethylene (HDPE), medium density polyethylene (MDPE), linear low density polyethylene (LLDPE) and polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, involves the use of a condensed liquid which vaporizes in the reactor thereby removing heat therefrom. Such a condensing agent generally is recondensed and recycled along with unreacted monomers. The monomer(s) and any other liquids or gases which it is desired to charge to the reactor, such as, for example a diluent gas or hydrogen chain transfer agent, are desirably thoroughly dried and purified prior to use. Suitably, such materials may be contacted with alumina or zeolite beds or otherwise purified prior to use.

The gas phase processes suitable for the practice of this invention are preferably continuous processes which provide for the continuous supply of reactants to the reaction zone of the reactor and the removal of products from the reaction zone of the reactor, thereby providing a steady-state environment on the macro scale in the reaction zone of the reactor. The produced polymer is discharged continuously or discontinuously from the fluidized bed as desired.

Typically, the fluidized bed of the gas phase process is operated at temperatures greater than 50° C., preferably from about 60° C. to about 110° C., more preferably from about 70° C. to about 110° C. Typically the molar ratio of comonomer to monomer used in the polymerization depends upon the desired density for the composition being produced and is about 0.5 or less. Desirably, when producing materials with a density range of from about 0.91 to about 0.93 the comonomer to monomer ratio is less than 0.2, preferably less than 0.05, even more preferably less than 0.02, and may even be less than 0.01. Further typically, the ratio of hydrogen to monomer is less than about 0.5, preferably less than 0.2, more preferably less than 0.05, even more preferably less than 0.02 and may even be less than 0.01.

The above-described ranges of process variables are appropriate for the gas phase process of this invention and may be suitable for other processes adaptable to the practice of this invention. A number of patents and patent applications describe gas phase processes which are adaptable for use in the process of this invention, particularly, U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,541,270 and EP applications 659,773; 692,500; and PCT Applications WO 94/29032, WO 94/25497, WO 94/25495, WO 94/28032; WO 95/13305; WO 94/26793; and WO 95/07942 all of which patents, publications or their equivalent U.S. applications are hereby incorporated herein by reference.

EXAMPLES

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

All syntheses of air or water sensitive compounds were performed under dry nitrogen or argon atmosphere using a combination of glove box and high vacuum techniques. Solvents were purified by passing through double columns charged with activated alumina and a supported metal catalyst (Q-5® available from Englehardt Chemical Company). The term "overnight", if used, refers to a time of approximately 16–18 hours. The term "room temperature", if used, refers to a temperature of about 20–25° C.

Example 1
Synthesis of Ammonium Ion Exchanged, Aluminum-Magnesium Silicate Aerogel 112 g of $NH_4NO_3$ is dissolved in 1.8 L of deionized water in a 2 L Erlenmeyer flask at room temperature under magnetic agitation, following which 40 g of montmorillonite clay (I) is added to the prepared solution. The resulting clay slurry is heated to 80° C. and maintained at this temperature for 2 hours then recovered by centrifuging and filtering. The recovered, ion-exchanged clay solid (II) is then redispersed in 1 L of deionized water to make a homogeneous dispersion using ultrasound (550 Sonic Dismembrator, Fisher Scientific, power setting 9 for 30 minutes). The homogeneous dispersion is divided into four aliquots in 1 L round-bottom flasks and frozen with liquid nitrogen while rotating the flasks. Water is removed under vacuum (Labconco Freeze-dryer 8, 2 days) to produce the ion-exchanged, aluminum-magnesium silicate aerogel (III). Bulk density was about 0.005 g/cm$^3$.

Example 2
Synthesis of Calcined, Ammonium Ion Exchanged, Aluminum-Magnesium Silicate Aerogel The ion-exchanged aluminum-magnesium silicate aerogel (III) from Example 1 is heated in a high temperature furnace at 500° C. for 6 hours under nitrogen to give a calcined, ion exchanged, aluminum-magnesium silicate aerogel (IV), having a bulk density of 0.004 g/cm$^3$. Residual water content was less than 0.1 percent by weight.

Example 3
Synthesis of Anilinium Ion Exchanged, Calcined, Aluminum-Magnesium Silicate Aerogel 0.5 g Of the calcined solid (IV) from Example 2 is dispersed in 100 ml of toluene under magnetic agitation for 1 hour resulting in a homogeneous suspension. 20 ml Of 99.5 percent dimethylaniline (Aldrich Chemical Company, Inc.) is added to the homogenized suspension. The resulting suspension is continuously agitated overnight at room temperature in a glove-box. Upon filtration and solvent removal (room temperature $1\times10^{-5}$ Torr for 24 hours), an anilinium ion exchanged, calcined, aluminum-magnesium silicate aerogel (V) is recovered. Bulk density was 0.004 g/cm$^3$.

Example 4
Synthesis of Chemically Modified, Anilinium Ion Exchanged, Calcined, Aluminum-Magnesium Silicate Aerogel About 250 mg of the anilinium ion exchanged, calcined, aluminum-magnesium silicate aerogel (V) from example 3 is dispersed in 150 ml of dry toluene, to give a homogeneous aerogel-toluene slurry. This slurry is mixed with 0.6 g of 100 percent tripropylaluminum and stirred for one hour. Upon filtration and solvent removal (room temperature $1\times10^{-5}$ Torr for 24 hours), a chemically modified, anilinium ion exchanged, calcined, aluminum-magnesium silicate aerogel (VI) is recovered. Bulk density is 0.004 g/cm$^3$.

Example 5
Synthesis of Supported Catalyst

To a toluene slurry of the chemically modified, anilinium ion exchanged, calcined, aluminum-magnesium silicate aerogel (VI) of Example 4 (250 mg) 1 mL of a 0.0025 M toluene solution of dimethylsilyl bis(2,methyl-4-phenylinden-1-yl)zirconium 1,4-diphenyl-1,3-butadiene is added. The solvent is removed under reduced pressure to make a supported polymerization catalyst (VII).

Propylene polymerization

The supported catalyst (VII) from Example 5 was slurried in toluene (5 ml) and added to a 2 L stirred, jacketed, stainless steel reactor under argon atmosphere containing 1 L of hexane. The reactor is charged with 10 psig (70 kPa) of propylene gas and heated to 75° C. for 3 h with propylene being supplied on demand. Afterwards the reactor is vented and the reaction mixture removed and filtered to remove the crystalline polymer. After drying under reduced pressure at 120° C., about 40 g of isotactic polypropylene is recovered. Yield is about 1 Kg/mg zirconium. Isotacticity as measured by $^{13}C$ NMR was 97 percent.

Example 6
Synthesis of Silylated Aluminum-Magnesium Silicate Aerogel 40 g of montmorillonite clay (I) is added 1 L of deionized water in a 2 L round-bottom flask. The resulting clay slurry is heated to 80° C. and maintained at this temperature for 2 hours and then separated by centrifugation at 2000 rpm for 60 minutes. The lamellar gel contained in the supenate is divided into four aliquots in 1 L round-bottom flasks and frozen with liquid nitrogen. Water is removed under vacuum (Labconco Freeze-dryer 8, 2 days). After complete removal of water vapor, a fluffy lamellar aerogel (VII) is obtained. (density 0.04 g/cc)

To 1 L of hexane was added 5 g of the dried lamellar aerogel with mechanical stirring at room temperature. After uniform dispersion of the aerogel, 47 g of trimethylchlorosilane was added drop wise with vigorous stirring over 15 minutes. The resulting mixture was refluxed for two hours, centrifuged and decanted to recover the silylated lamellar aerogel. The aerogel material was washed three times by resuspending in 500 ml of hexane, centrifuging and decanting. The washed material was then vacuum stripped to remove organic and inorganic volatiles in a water bath at 50° C. Vacuum stripping was continued for several hours. The dried, silylated, lamellar, aerogel was then suspended in 500 ml of I M HCl with vigorous stirring for 2 hours, centrifuged, washed and resuspended in 500 ml of water. The suspension was then freeze dried to form an acid-treated, silylated, lamellar aerogel. (density 0.05 g/cc)

To 150 ml of toluene was added 0.125 g of the acid-treated, silylated, lamellar aerogel with agitation. The resulting slurry was mixed with 0.3 ml of 1M tripropylaluminum solution and 0.5 ml of 2.5 $\mu$M toluene solution of dimethyl silane bis(2,methyl-4-phenylinden-1-yl)zirconium 1,4-diphenyl-1,3-butadiene to make an active polymerization catalyst. The catalyst slurry in an argon atmosphere is connected to a 10 psig (70 kPa) propylene gas stream at 70° C. for 1 hour. 17.4 g of high molecular weight isotactic polypropylene was obtained.

Example 7

10 g of purified montmorillonite is dispersed in 1000 ml of 1M HCl solution at ambient conditions for 12 hours in an Erlenmeyer flask. The slurry is filtered to recover an HCl treated clay gel. The ion-exchanged montmorillonite is washed once by resuspension in 500 ml deionized water for 30 minutes, and recovered by filtration. The recovered ion-exchanged montmorillonite cake is then frozen in liquid nitrogen, either directly or after resuspending in 500 ml deionized water. and then freeze-dried inside a Labconco Freeze Drier 8. A very fluffy lamellar aerogel is obtained after the water is removed by freeze-drying. The lamellar aerogel sample is removed from the Freeze-Drier, transferred to a narrow neck flask, and placed on high vacuum line and exposed to a high vacuum for 24 hours at room temperature. The same method is also employed to make aluminum-magnesium silicate aerogels from hectorite (Optigel®, available from Sud Chemie AG), laponite, and fluoromica clays.

0.125 g of the above acid-treated aluminum-magnesium silicate aerogel is dispersed in 150 ml of toluene to make a slurry. 0.3 ml of 1M tripropylaluminum solution and then 0.5 ml of 2.5 $\mu$M of solution of dimethyl silane bis(2-methyl-4-phenylinden-1-yl)zirconium 1,4-diphenylbutadiene are added to the slurry in an argon atmosphere at room temperature. The slurry is then exposed to propylene at 700 C. at 10 psig for one hour. 14.5 g Of isotactic polypropylene is produced.

Example 8

5 g of silylated lamellar aerogel of Example 6 is added to 600 ml of deionized water under magnetic agitation at room temperature overnight. Centrifugation of the slurry at 2000 RPM for 1 h is used to discard the precipitate at the bottom of the container. Acid ion-exchange resin (Dowex HCRS) is then gradually introduced into the supernatant until the pH of the slurry reached 2–3. The mixture was further magnetically agitated for 2 h at room temperature before decanting the liquid to separate the solid acid resin. The liquid collected is rapidly cooled with liquid nitrogen, then dried inside a Labconco Freeze Drier 8. A very fluffy lamellar aerogel (density 0.05 g/cc) is obtained after the water is removed by freeze-drying. The lamellar aerogel sample is removed from the Freeze-Drier, transferred to a narrow neck flask, placed on high vacuum line, and exposed to a high vacuum for 24 hours at room temperature.

0.250 g of the above protonated, silylated lamellar aerogel is dispersed in 150 ml of toluene to make a slurry. 0.6 ml Of 1M tripropylaluminum solution and 1.0 ml of 2.5 $\mu$M of dimethyl silane bis(2-methyl-4-phenylinden-1-yl)zirconium 1,4-diphenylbutadiene solution are added to the slurry at room temperature under an argon atmosphere. The slurry was then exposed to propylene at 700 C. at 10 psig for one hour. 17.0 g of isotactic polypropylene is produced.

Example 9

Preparation of Agglomerated Aluminum-Magnesium Silicate Aerogel

In a 500 ml flask, 8 g of the lamellar aerogel (VII) of Example 6 is added to 100 ml of deionized water with agitation at room temperature. After uniform dispersion, 16 g of a 40 percent solution of potassium silicate and 12 g of formamide and an additional 100 ml of the deionized water is added sequentially to the slurry. The resulting slurry was added to a dispersion of 500 ml of o-dichlorobenzene containing 4 g of cetyltrimethylammonium bromide and 2 g of a finely divided silica having particle sizes in the range of 20–30 nm. Upon agitation at 300 rpm for ten minutes a uniform water in oil emulsion is formed. Agitation is continued for 30 minutes at 90° C. and the emulsion is then diluted with 500 ml of acetone and the resulting solid spheroidal particles are isolated by filtration. The agglomerated lamellar aerogel is treated with 500 ml of aqueous 1M hydrochloric acid overnight with agitation, separated, and air dried. The material is then ground into smaller particles using a ball mill and calcined at 540° C. for 24 hours.

In a glove box, at room temperature over a period of two hours, a solution of 30 ml of toluene and 15 ml of a 1 M hexane solution of aluminum triethyl is added to 1.5 g of the foregoing agglomerated, lamellar aerogel. The resulting product is washed with toluene and recovered after vacuum drying. The dried, agglomerated, lamellar aerogel is then added to 30 ml of a 1.25 $\mu$M toluene solution of dimethyl silane bis(2-methyl-4-phenylinden-1-yl)zirconium 1,4-diphenylbutadiene. After mixing for 30 minutes at room temperature the resulting solid is separated, washed with toluene and vacuum dried overnight, thereby forming a supported, agglomerated, polymerization catalyst having a density of 5 g/cc, and a surface area of 500 $M^2$/g.

11 mg of the catalyst and 6 g of liquid propylene are sealed into an autoclave reactor and heated at 70° C. for one hour. About 1.2 g of isotactic polypropylene is recovered.

Example 10

Preparation of Ammonium Ion Exchanged Lamellar Aerogel

In an Erlenmeyer flask, 6 g of hectorite (Laponite RD, Southern Clay Product, Inc.) were dispersed in 500 mL of deionized water (pH ca. 5) containing 2 g of N,N,-dimethylanilinium chloride and held overnight at room temperature. The slurry was filtered to yield ion-exchanged Laponite RD. The ion-exchanged Laponite RD was washed once by resuspension in 500 mL of deionized water for 30 minutes, and then recovered by filtration. The recovered filter cake was resuspended in 500 mL of deionized water and freeze-dried as described in Example 1. Very fluffy lamellar aerogel with a light blue color was obtained.

Example 11
Preparation of Ammonium Ion Exchanted, Silylated Lamellar Aerogel A 2 L round-bottom flask was loaded with 40 g of montmorillonite (University of Missouri, Swy-1, Crook County, Wyo., USA; or CWC purified montmorillonite, Lot# PC-054-98 from Nanocor) and 1 L of deionized water. With magnetic stirring or sonication, the temperature of the slurry was elevated to 80° C. and was held at that temperature for 2 hours. The resulting gel-like slurry was subjected to centrifugation for about 60 minutes at 2000 RPM and filtered. The filtrate, a lamellar silicate suspension, was freeze dried substantially according to the procedure of Example 1.

A flask was loaded with 5 g of freeze dried montmorillonite lamellar aerogel prepared as described above, and slurried in 1 L of hexanes at room temperature with mechanical stirring. From an addition funnel, 47 g of chlorotrimethylsilane (Aldrich) were dropped into the slurry over a 15 minute period. The system was heated to reflux for 2 hours. The product was centrifuged, and the liquid was decanted to recover the silylated lamellar aerogel material. This product was washed three times by resuspending in 500 mL of hexanes, centrifuging and decanting. The washed lamellar aerogel product was then transferred to a 1 L flask and volatiles were removed by rotovap under a vacuum pump in a water bath at a temperature of 50° C. The dry silylated lamellar aerogel solid was further treated under vacuum ($10^{-2}$ torr) for several hours, and then collected.

The silylated lamellar aerogel was transferred to a 1 L Erlenmeyer flask and suspended in 500 mL of deionized water with vigorous stirring. To this suspension, 2.0 g of N,N-dimethylanilinium chloride were then added and the slurry was stirred open to the laboratory atmosphere overnight. The ammonium ion exchanged lamellar aerogel was then collected by filtration, washed once by resuspending in 500 mL of fresh deionized water and collected by filtration. The lamellar aerogel was slurried with about 100 mL of deionized water in a 500 mL of flask and again freeze-dried. The freeze-dried product was further treated under vacuum ($<10^{-6}$ torr) for about 18 hours at room temperature.

Example 12
Preparation of Ferrocenium Salt Modified Fluoromica Aerogel

In a 1 L Erlenmeyer Flask, 10 g of fluoromica (NaMg$_{2.5}$(Si$_4$O$_{10}$)F$_2$, Coop Me-100, <0.2 percent weight loss below 800° C.) were dispersed in 600 mL of deionized water at ambient conditions for one hour. The white fluoromica was observed to swell and disperse in water yielding a semi-transparent slurry. In a separate flask, 2.5 g of ferrocene (Aldrich) were added to 20 mL of concentrated sulfuric acid and the resulting mixture was held under ambient conditions for one hour, producing a navy blue solution. This solution was diluted with 200 mL of deionized water, and then mixed with fluoromica slurry under magnetic stirring. Large blue agglomerates were observed. The mixture was stirred at room temperature for 30 minutes, then filtered, yielding a blue gel. The blue gel was washed by resuspending in 800 mL of deionized water for 30 minutes, and was recovered by filtration. This product was then dispersed in 500 mL of deionized water and freeze-dried. The dried, fluoromica lamellar aerogel was held on a high vacuum line ($<10^{-6}$ torr) at 150° C. overnight.

Homogeneous Solution Polymerizations

A stirred 2.0 liter reactor is charged with 740 g of Isopar-E™ mixed alkanes solvent (available from Exxon Chemicals Inc.) and 118 g of 1-octene comonomer. Hydrogen is added as a molecular weight control agent by differential pressure expansion from a 75 ml addition tank at 25 psi (2070 kPa). The reactor is heated to the polymerization temperature of 140° C. and saturated with ethylene at 500 psig (3.4 MPa). Catalyst ((t-butylamido)dimethyl (tetramethyl-cyclopentadienyl)silanetitanium (II) 1,3-pentadiene) and lamellar aerogel, about 1.0 μmol each, (as 0.005M or 0.010M solutions in toluene) are mixed and transferred to a catalyst addition tank and injected into the reactor. The polymerization conditions are maintained for 15 minutes with ethylene added on demand. The resulting solution is removed from the reactor, and 10 ml of a toluene solution containing approximately 67 mg of a hindered phenol antioxidant (Irganox™ 1010 from Ciba Geigy Corporation) and 133 mg of a phosphorus stabilizer (Irgafos 168 from Ciba Geigy Corporation) are added. Between polymerization runs a wash cycle in which 850 g of Isopar-E™ is added to the reactor and the reactor heated to 150° C. The reactor is emptied of the heated solvent immediately before beginning a new polymerization run. Results are contained in Table 1.

TABLE 1

| run # | lamellar aerogel | μmoles Cat/Aerogel | exotherm (° C.) | yield (g) | Efficiency g polymer/μg Ti |
|---|---|---|---|---|---|
| 1 | Example 11 | 0.25/50 | 0.6 | 22.4 | 1.87 |
| 2 | Example 12 | 0.25/50 | 4.1 | 110.1 | 9.20 |
| 3* | Example 12 | 0.25/12 | 0.8 | 73.5 | 6.14 |

*In addition to catalyst and lamellar aerogel, 12.5 μmol of triisopropylaluminum was added to the catalyst formulation, giving an Al/Ti molar ratio of 50.

What is claimed is:

1. An ion-exchanged aluminum-magnesium silicate aerogel or an ion-exchanged fluorinated magnesium silicate aerogel having a bulk density from 0.1 to 0.001 g/cm$^3$.

2. The aerogel of claim 1 that has been functionalized by treatment with a chemical modifying agent selected from the group consisting of trihydrocarbylaluminum compounds, trihydrocarbylchlorosilane compounds, and hydrocarbylsiloxane compounds containing from 3 to 20 atoms not counting hydrogen.

3. The aerogel of claim 1 or 2 that has been treated with a catalyst activating material able to form active polymerization catalysts from group 3–10 metal complexes, and contacted with a group 3–10 metal complex or compound.

4. The aerogel of claim 3 which has been calcined.

5. A particulated support material for use in preparing supported catalysts for addition polymerizations comprising an ion-exchanged aluminum-magnesium silicate aerogel or an ion-exchanged fluorinated magnesium silicate aerogel according to claim 3.

6. The support material of claim 5 in the form of agglomerated particles.

7. The support material of claim 5 wherein the aerogel has been ion-exchanged with a cation selected from the group consisting of H$^+$, conjugate acids of Lewis bases, reducible Lewis acid cations, and reducible metal cations.

8. The support material of claim 7, wherein the aerogel, has also been calcined.

9. A composition comprising the support material of claim 5 which has been treated with one or more group 3–10 metal complexes so as to deposit said complex thereon in an amount from 0.00001 to 1,000 mg/g of support.

10. A ion-exchanged aluminum-magnesium silicate aerogel or an ion-exchanged fluorinated magnesium silicate aerogel having a bulk density from 0.1 to 0.001 g/cm$^3$ prepared by freeze-drying an aqueous dispersion of a silicate material selected from the group consisting of clay and mixtures of aluminum silicate and magnesium silicate compounds and ion-exchanging at least a portion of native alkali metal cations or alkaline earth metal cations with a cation selected from the group consisting of H$^+$, conjugate acids of Lewis bases, reducible Lewis acid cations, and reducible metal cations before or after the foregoing freeze-drying process.

* * * * *